United States Patent
Barthel et al.

[11] Patent Number: 6,123,762
[45] Date of Patent: Sep. 26, 2000

[54] LOW-DUST, WELL DISPERSIBLE GRANULATES BASED ON SILICATE FILLERS MODIFIED WITH ORGANOSILICON COMPOUNDS

[75] Inventors: Thomas Barthel, Hanau; Udo Görl, Bornheim; Alan Parkhouse, Wesseling; Kurt Eichenauer, Bad Soden-Salmunster, all of Germany

[73] Assignee: Degussa-Huls AG, Frankfurt, Germany

[21] Appl. No.: 08/814,923

[22] Filed: Mar. 12, 1997

[30] Foreign Application Priority Data

Mar. 12, 1996 [DE] Germany ............ 196 09 619

[51] Int. Cl.$^7$ ............ C09C 1/28; C09C 3/12; C08J 3/12
[52] U.S. Cl. ............ 106/490; 106/447; 106/448; 106/287.1; 106/287.11; 106/287.14
[58] Field of Search ............ 106/287.1, 287.11, 106/287.12, 287.13, 287.14, 287.15, 447, 448, 490

[56] References Cited

U.S. PATENT DOCUMENTS

| | | | |
|---|---|---|---|
| 3,227,675 | 1/1966 | Papalos | 106/487 |
| 3,567,680 | 3/1971 | Iannicelli | 106/487 |
| 3,924,029 | 12/1975 | Schutte et al. | 106/481 |
| 4,151,154 | 4/1979 | Berger | 523/203 |
| 4,576,888 | 3/1986 | Miyakawa et al. | 106/490 |
| 4,704,414 | 11/1987 | Kerner et al. | 523/213 |
| 5,001,183 | 3/1991 | Sands et al. | 106/490 |
| 5,008,305 | 4/1991 | Kennan et al. | 106/490 |
| 5,116,886 | 5/1992 | Wolff et al. | 523/209 |
| 5,653,794 | 8/1997 | Weber et al. | 106/442 |

*Primary Examiner*—C. Melissa Koslow
*Attorney, Agent, or Firm*—Pillsbury Madison & Sutro LLP

[57] ABSTRACT

The invention relates to granulates based on silicate fillers, the surface of which was modified with organosilicon compounds, a process for manufacturing the granulates by spraying a suspension of these fillers together with the organosilicon compounds in a spray granulator and the use of the granulates in vulcanizable rubber mixtures.

15 Claims, 5 Drawing Sheets

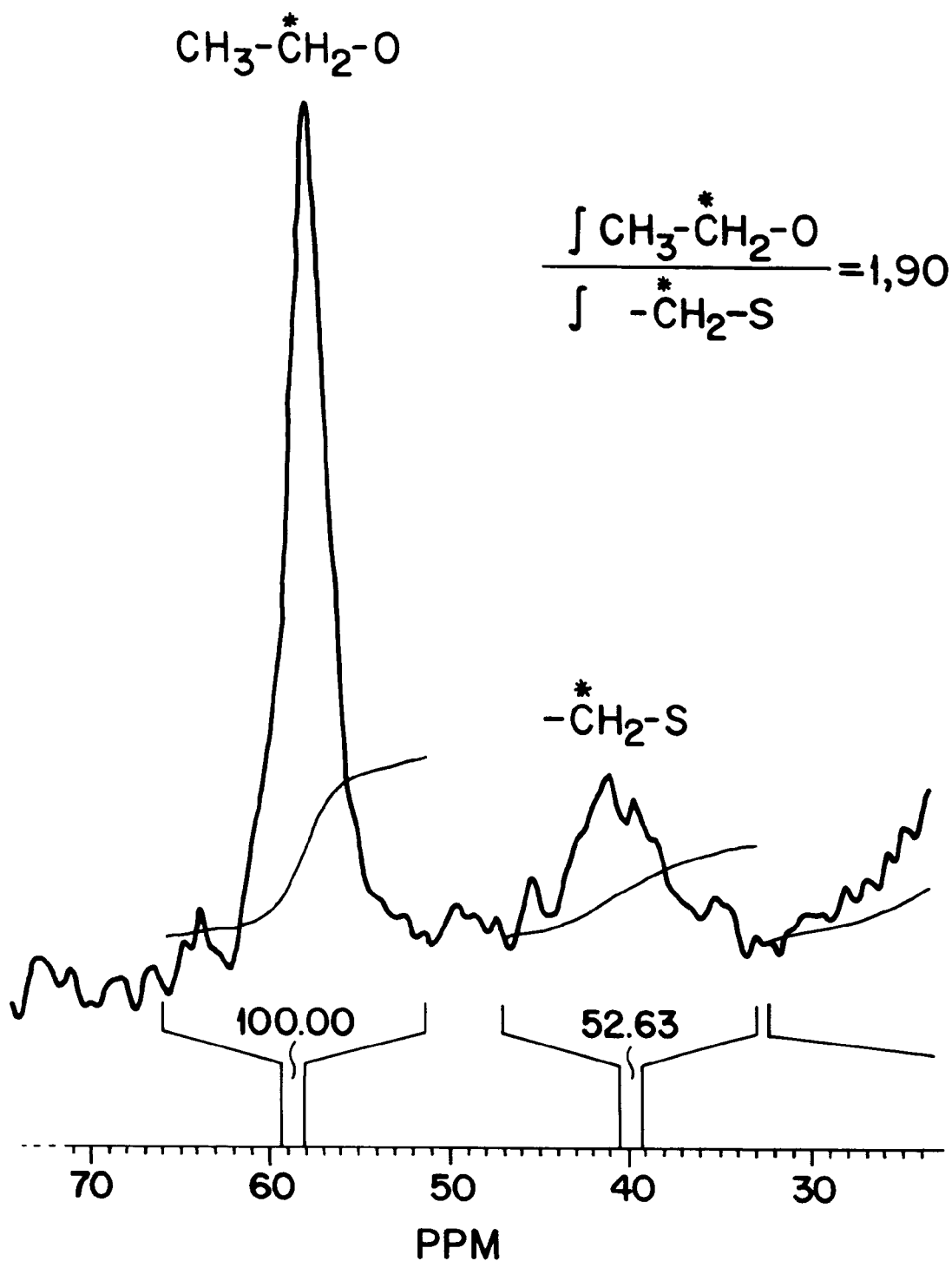

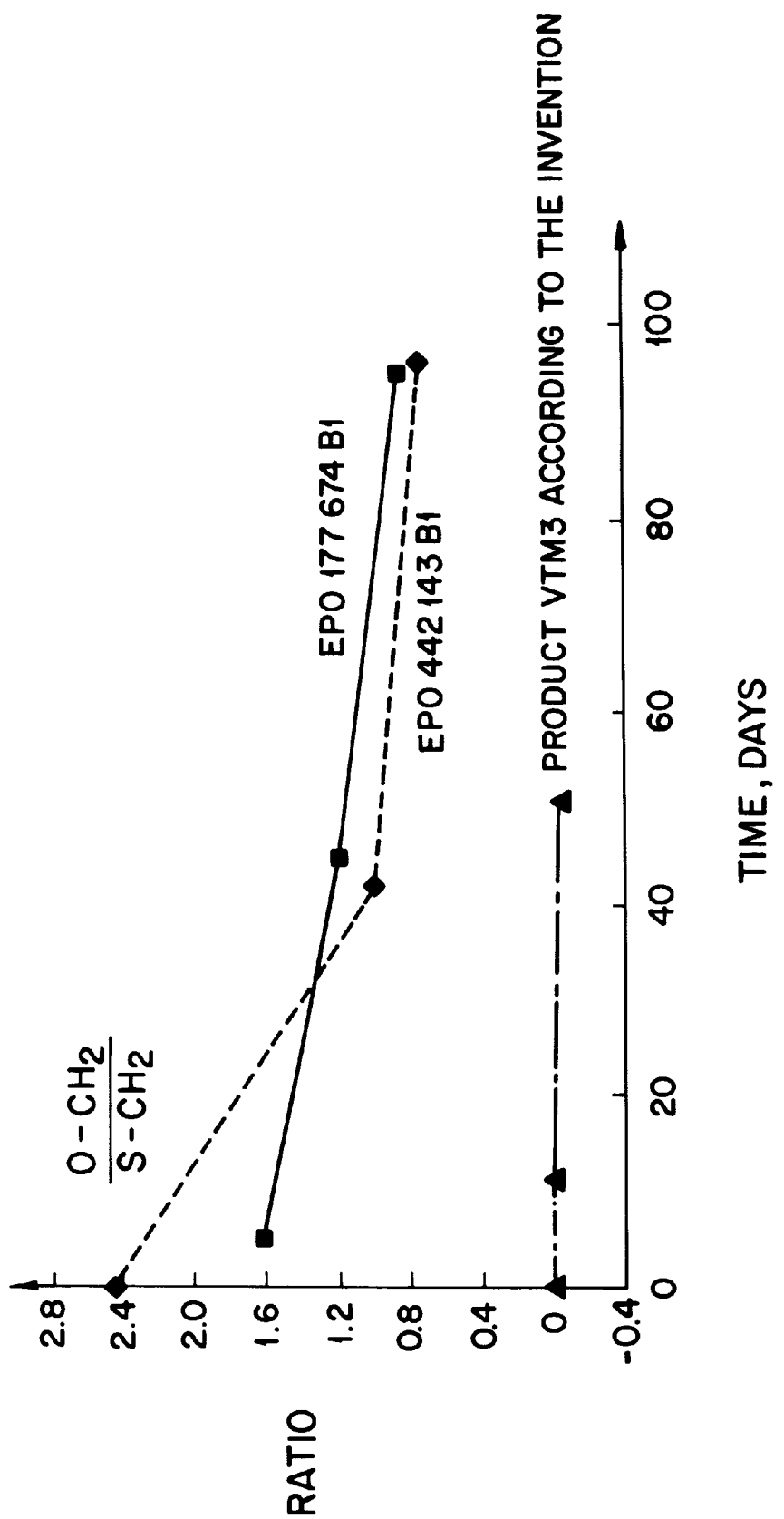

LOW-DUST, WELL DISPERSIBLE GRANULATES BASED ON SILICATE FILLERS MODIFIED WITH ORGANOSILICON COMPOUNDS

BACKGROUND OF THE INVENTION

The invention relates to low-dust, well dispersible granulates based on silicate fillers modified with organosilicon compounds, their manufacture and use.

It is known to treat oxidic surfaces with organosilicon compounds in order, by means of this pre-treatment, to improve the bond between oxidic filler and organic polymers of the most varied chemical composition and hence to improve the strengthening properties of the fillers in the polymers. For this purpose it is possible, for example, to dissolve the organosilicon compound in question in an organic solvent and then treat clays, for example, with this solution (U.S. Pat. No. 3,227,675 HUBER). From U.S. Pat. No. 3,567,680 it is known to modify kaolins suspended in water with mercapto- and aminosilanes. The organosilicon compounds in question are water-soluble in the quantities required for modification, however, so that in this case also the treatment of the filler takes place from a solution.

U.S. Pat. No. 4,151,154 relates to oxidic silicate fillers whose surface is subjected to a treatment with two types of organosilicon compounds. The oxidic particles are treated in such a way that they have a greater affinity for water and can also be more easily dispersed in aqueous systems.

The use of organosilicon compounds containing sulphur in vulcanizable rubber mixtures is known from U.S. Pat. No. 4,076,550. This compound can also be used in mixtures with silica, but these are not thermally pre-treated and have only limited storage stability. EP-PS 0126 871 (U.S. Pat. No. 4,514,231) describes a process in which the surface of silicate fillers is modified with the aid of an aqueous emulsion of water-insoluble organosilicon compounds.

U.S. Pat. No. 4,141,751 relates to a process which is carried out entirely without solvents, but it is not practicable for certain organosilicon compounds, as practical experience shows.

EP 0442 143 B1 (U.S. Pat. No. 5,116,986) describes a process in which the silane is homogenized with the filler without solvent and water in a two-stage production process initially at room temperature in a heavy-duty mixer and then brought to reaction at elevated temperature.

Products produced according to this process have been on sale for about three years under the name of Coupsil(r). As they occur in powder form they must then be transformed into the desired low-dust form in an additional granulation process. If this is carried out according to the prior art, a less satisfactory dispersibility can be expected.

A further patent which describes the modification of silicate fillers with organosilanes is EP 0177 674 B1 (U.S. Pat. No. 4,704,414). In this case the silica is suspended in water, mixed with an aqueous silane emulsion with the addition of emulsifiers and then dried at elevated temperature. In this case also, an additional granulation process must follow, in order to produce a low-dust product, and this is known to impair the dispersibility of the modified material.

Products which are obtained according to patents EP 0442 143 and EP 0177 674 are characterized in that including after reaction of the alkoxysilyl group(s) of the organosilane with the silanol groups on the surface of the silicate filler used, which takes place with the liberation of an alcohol, a part of the alkoxy groups remains behind on the surface unreacted. In the course of storage of the products obtained according to the prior art, however, these groups react further in an undesired manner, with the liberation of alcohol. Even during processing in the manufacture of rubber articles, such as during extrusion, the alcohol liberation can lead to pore formation and hence to the impairment of the rubber technology properties of the vulcanizates. Furthermore, during the entire manufacturing process of the rubber article, starting with the mixing process through the further processing of the mixture and up to the vulcanization of the product, alcohol arises and is released into the atmosphere, which no longer complies with current demands regarding workplace hygiene.

BRIEF DESCRIPTION OF THE DRAWINGS

FIG. 2a is $^{13}$C—NMR spectrum of the product according to EP 442,143.

FIG. 3 is $^{13}$C solid body NMR spectroscopy intensity ratio of the samples after storage.

SUMMARY OF THE INVENTION

Figure 1:
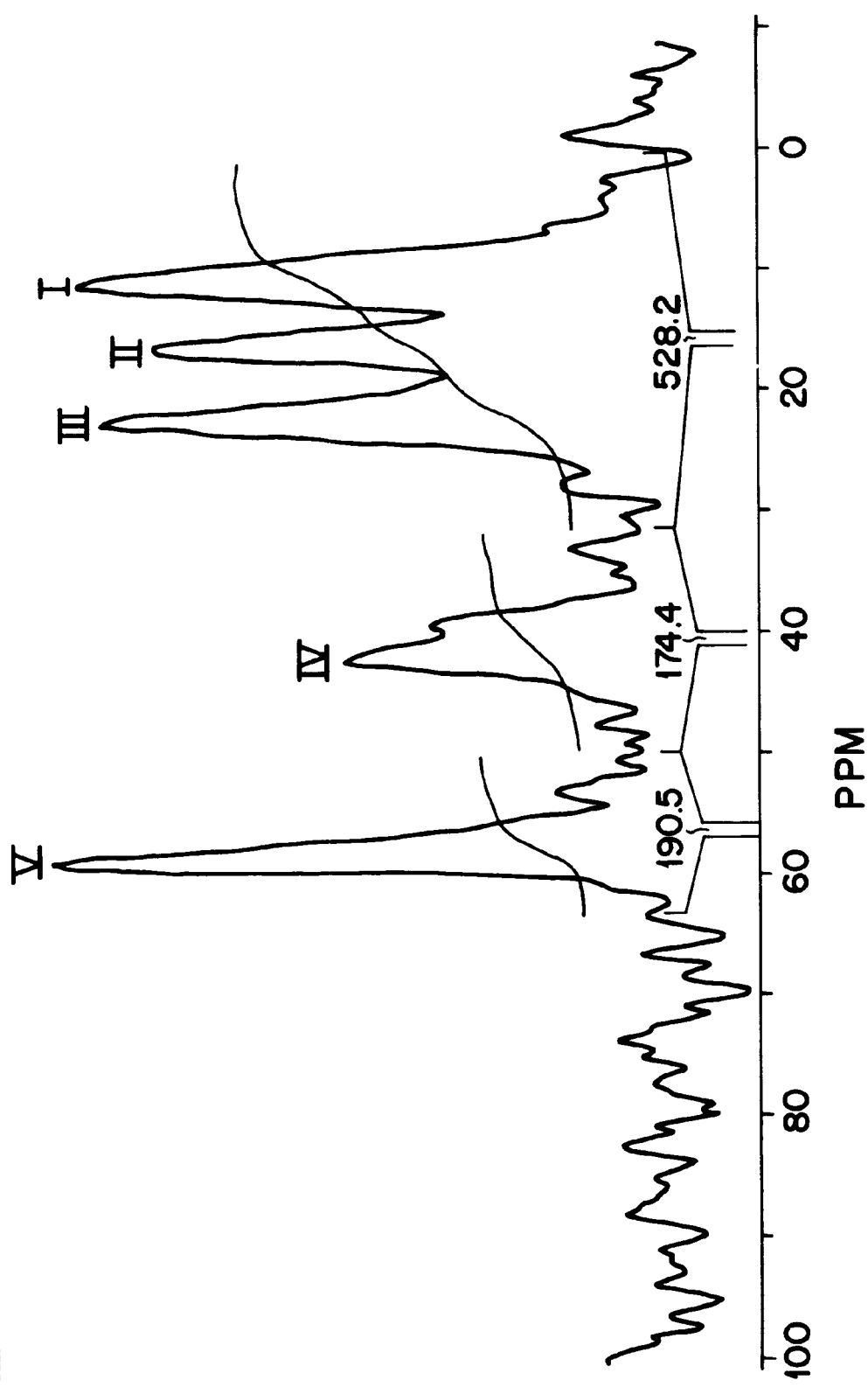
FIG. 1 is the $^{13}$C—NMR spectrum of an Si 69-modified silica.

The object of the invention is a process for manufacturing low-dust, well dispersible granulates based on precipitated silicate fillers modified with organosilicon compounds. The organosilicon compounds used should have extensively finished reacting with the OH groups on the surface of the fillers. The invention provides low-dust, well dispersible granulates based on silicate fillers manufactured by precipitation and modified with organosilicon compounds of the general formula (I):

$$[R^1{}_n\ (R\text{—}(CH_2)_iO)_{3-n}Si\text{—}(CH_2)_y\text{—}(CH_2)_z]_q \qquad [B]$$

where

B: -SCN, -CH, -Cl, -NH$_2$ (when q=1) or -S$_x$- (when q=2), wherein the silanes containing sulphur are preferred.

R and R$^1$: an alkyl group with 1 to 4 carbon atoms, wherein all groups R and R$^1$ may have the same or a different meaning in each case, R: additionally H, n: 0; 1 or 2, y: 0 to 19, particularly 0 to 4, z: 1, i: 1, x: a number from 2 to 8, wherein the degree of reaction of the alkoxy groups is given in the form of the integration ration of the signals obtained by means of $^{13}$C-NMR spectroscopy and the following values are produced:

R≈H:

$$\frac{(CH_2)_i}{(CH_2)_z}$$

≦0.4 where q=2, ≦0.15 where q=1

R=H:

≦0.4 where q=2, ≦0.15 where q=1

DETAILED DESCRIPTION OF THE PREFERRED EMBODIMENTS

The smaller the ratio, the fewer alkoxy groups which have not yet finished reacting are present. According to the invention the value of virtually zero is also obtained (see Example 4). The value of ≦0.4 for compounds where q=2 is always exceeded in the case of the forms of use known according to the prior art.

At this point one might mention the direct addition of both components (filler, silane) to the rubber mixture (in situ process) and the products obtained according to EP 0442 143 B1 and EP 0177 674 B1. The same also applies to compounds where q=1, in which a value ≦0.15, preferably ≦0.1 is found according to the invention.

The invention also provides granulates which are characterized in that they contain precipitated silica as basis, and after modification the granulate has a specific surface ($N_2$● (BET) of 35 to 400 $m^2$/g, particularly 100 to 250 $m^2$/g, a CTAB surface of 35 to 350 $m^2$/g, particularly 100 to 250 $m^2$g, and a DBP number of 100 to 300 ml/100 g, particularly 150 to 250 ml/100 g.

Preferably it is a more flowable granulate than is known from the prior art, which comprises extensively spherical particles. The bulk density is in the range from 180 to 280 g/l, preferably from 210 to 230 g/l.

The claimed granulates were manufactured according to a process which the invention also provides. The principles of fluidized bed spray granulation are part of the prior art (Chem.Ing.Techn. 62 (1990) 822 to 834).

Use in the field of precipitated fillers and particularly a reaction of the organosilicon compound with the filler to be granulated which takes place during the granulation is, however, novel.

The process for manufacturing the granulates according to the invention is characterized in that it comprises the following steps:

a) Manufacture of an aqueous suspension of the silicate filler with a pH of 1 to 5,
b) Spraying or nozzle-injecting this suspension and one or more of the compounds according to formula (I) into a fluidized bed produced with hot air,
c) Removal of the arising moist granulate modified with organosilane compounds in the desired grain size,
d) Drying of the granulate, optionally in different temperature stages,
e) Optionally separating out the fine portions and returning them to the fluidized bed,
f) Adapting the pH of the granulate to a range from 5.5 to 8.5, preferably 6 to 7.5.

A screening step optionally follows.

Silicate fillers which are used in the rubber industry are generally obtained by means of precipitation processes. Starting materials are alkali silicate solutions, preferably soda waterglass, out of which amorphous silicas are precipitated by addition of acid for example. Metal silicates such as calcium silicate and aluminium silicate are obtained if the acid used in the precipitation is partially or wholly replaced by metal salts which form not readily soluble deposits with waterglass. The suspensions obtained in the precipitation are transferred into filter presses in which the salts which arose during the reaction are washed out as extensively as possible. The filter cake thus produced is preferably used in the process according to the invention for step a): manufacturing an aqueous suspension of the silicate filler with a solids content of 17 to 24%, by liquefying the filter cake obtained after the precipitation process and subsequent filtration step, preferably with the addition of 15 to 30% sulphuric acid and use of shearing energy, wherein the pH of the suspension ranges from 1 to 5.

The sulphuric acid is used in a quantity that is sufficient to obtain a pumpable and sprayable suspension.

Alternatively the organosilicon compound can be mixed into the suspension so that a solid/silane suspension is fed into the fluidized bed via a multi-component nozzle. It is, however, equally possible to meter the solid suspension and the organosilicon compound into the fluidized bed via separate nozzles, but at the same time. The quantity of this compound generally amounts to >0 to 25 wt. %, advantageously 5 to 12 wt. %. The maximum silane concentrations to be used are meaningfully proportional to the specific surface of the silicate fillers used, particularly the silicas.

The increase in mass in the fluidized bed is compensated in stationary operation by means of continuous granulate removal, wherein granulate is drawn off via the outlet price by means of purposeful management of the extraction air, from a desired grain size. The fine dust extracted from the drying chamber with drying air is separated and returned to the granulation process as solid nuclei. If the compound granulates according to the invention are produced from silica filler and organosilane the temperature in the fluidized bed is generally 40 to 55° C. at inlet air temperatures of 150 to 600° C., preferably 250 to 400° C. The moist granulate removed from the granulation process is further dried to the desired end product moisture in a fluidized be dryer at generally 30 to 55° C. and optionally tempered to a maximum product temperature of approx. 150° C. Subsequent neutralization, to a practically relevant pH preferably around the neutral point of 7, usually follows, by means of ammonia for example.

Because of the cooling limit temperatures at the particle surfaces, the silane is not damaged during the granulation in the fluidized bed despite the high inlet air temperatures. The temperature in the fluidized bed and hence the water content of the removed moist granulate substantially determine the achievable particle sizes. Granulates with as narrow a grain spectrum as possible between 125 and 600 (occur according to the invention without additional binders, preferably at a water content of the moist granulate of 55 to 70 wt. %, particularly 63 to 67 wt. %.

The moist granulate removed from the granulation process is further dried in a fluidized bed dryer to the desired end product moisture and optionally tempered. In respect of the air quantities (/velocities), the dryer should be designed in such a way that no granulate destruction takes place on the one hand and that fine dust is removed from a desired lower grain size on the other hand.

The invention also provides the use of these reaction products according to the invention, between silica and organosilane, in vulcanizable rubber mixtures, characterized in that these mixtures contain 5 to 150 parts, particularly 15 to 80 parts of the products, related to 100 parts of rubber. The reaction products according to the invention are added to the rubber mixture either on a kneader or on the roller in the manner that is conventional in the rubber industry.

Carbon black may additionally be present in these mixtures, in a quantity from >0 to 100 parts, related to 100 parts of rubber.

The total quantity of the fillers should not exceed 200 parts.

The products according to the invention may be used in all rubber types, as listed in DIN/ISO 1629, which can be crosslinked with accelerators/sulphur but also by peroxide. Worthy of mention in this case would be elastomers, natural and synthetic, oil-extended or otherwise, in the form of individual polymers or blend with other rubbers such as natural rubbers, butadiene rubbers, isoprene rubbers, butadiene-styrene rubbers, particularly SBR, produced by means of the solution polymerization process, butadiene-acrylonitrile rubbers, butyl rubbers, terpolymers of ethylene, propylene, non-conjugated dienes. The following additional rubbers can also be considered for rubber mixtures with the rubbers quoted: carboxyl rubbers, epoxy rubbers, trans-polypenteneamer, halogenated butyl rubbers, rubbers of 2-chloro-butadiene, ethylene/vinyl acetate copolymers, ethylene/propylene copolymers, optionally also chemical derivatives of natural rubber and modified natural rubbers. Also known are the conventional further constituents such as natural fillers, plasticizers, stabilizers, activators, pigments, anti-ageing agents and processing auxiliary materials in the conventional measured quantities.

The products according to the invention are used in all rubber applications such as tires, conveyor belts, seals, V-belts, hoses, shoe soles etc. and are distinguished in such cases by a particularly good rubber technology profile which is notable in particular in the modulus, abrasion resistance and lose angle tan ((60° C. ($\approx$ roll resistance)).

The invention provides the rubber mixtures and vulcanizates manufactured using the products according to the invention. The granulate manufactured according to the invention has an unusually large number of properties which products known from the prior art do not process.

The reaction between organosilicon compound and silicate surface proceeds so completely that virtually non free alkoxy groups can be detected. This leads to high storage stability and to improved incoporability into rubber mixtures.

The granulates have a low dust content. At 0.5 to 5 wt. % of a particle size of <200 mesh (74 mm) it is distinctly below that of known non-modified silica granulates (VN3/VN2 granulate).

The granulates are flowable and because of their strength permit transport over bucket conveyors, vibrating troughs etc., for example, and easy meterability.

The high bulk density (180 to 280 g/l) permits inexpensive packing.

In addition to the strength required for transport and metering the granulates simultaneously have the ready dispersibility that is required for good incorporability into rubber mixtures.

The granulates are generally not structurally damaged and despite the granulation process exhibit no substantial decline in the DBP number.

Test standards used in the examples:

| | Unit | Standard |
|---|---|---|
| Tensile strength | MPa | DIN 53 504 |
| 300% modulus | MPa | DIN 53 504 |
| Tear strength | N/mm | DIN 53 507 |
| Shore A hardness | — | DIN 53 505 |
| DIN abrasion resistance | mm$^3$ | DIN 53 516 |
| MTS | — | DIN 53 513 |
| Ball rebound specification | % | Firestone |
| Elongation at break | % | DIN 53 504 |

The following chemicals are used in the examples:

| | |
|---|---|
| Si69 | Bis(triethoxysilylpropyl) tetrasulphide (Degussa AG) |
| Buna VSL 5025 1 HM | Solvent polymerization based styrene butadiene rubber (Bayer AG) |
| Buna CB 11S | Polybutadiene rubber (Bayer AG) |
| Naftolen ZD | Aromatic plasticizer (Chemetal) |
| Vulkanox 4020 | Staining anti-oxidant based on phenylenediamine (Bayer AG) |
| Protector G 35 | Anti-ozonant wax (Fuller) |
| Vulkacit D | Diphenylguanidine (Bayer AG) |
| Vulkacit CZ | Benzothiazyl-2-cyclohexylsulphenamide (Bayer AG) |
| Ultrasil 3370 GR | Precipitated silica with a BET surface of 175 m$^2$/g (Degussa AG) |
| Modified product according to (U.S. Pat. No. 5,116,886) EP 0 442 143 B1 | Coupsil VP 7108, development product, produced from Ultrasil 3370 and Si 69 (7.4%) (Degussa AG) |
| Modified product according to EP 0 177 674 B1 (U.S. Pat. No. 4,704,414) | Development product, produced from Ultrasil 3370 and Si 69 (7.4%) (Degussa AG) |
| VTM3/VTM4 | Reaction product according to the invention, produced from Ultrasil 3370 filter cake and Si 69 (7.4%) (Degussa AG). |

A) Continuous process for manufacturing VTM4

In a suitable mixing container, 120 kg of Ultrasil BV 3370 filter cake (78% H2O to 22% solids) are liquefied at room temperature by adding 0.15 kg of H2SO4 (25%) under vigorous agitation. 2.112 kg of Si 69 are added and the tank contents homogenized at room temperature under agitation. The total mixing time does not exceed 30 minutes. The above procedure is repeated in another mixing container so that a batch of the acidic liquefied filter cake/Si 69 mixture is always available. The acidic liquefied filter cake/Si 69 mixture is continuously injected into a spray granulator heated at approx. 40° C. Solid granulate particles with a water content of approx. 63% form in the spray granulator fluidized bed and are continuously conveyed to a fluidized bed dryer with an inlet air temperature of up to 300° C.

The granulate removed from the spray granulator fluidized bed is dried down to a water content of 0 to 5% in the fluidized bed dryer to a maximum product temperature of approx. 140° C. At the same time the granulate is set to a pH between 5.5 and 8.5 by means of ammonia.

After the fluidized bed dryer the VTM4 product (approx. 74 kg/h) is conveyed into the end product silo.

| Analysis | VTM4 | Ultrasil 3370 Gr. |
|---|---|---|
| Sulphur determination [%] after Wickbold DIN 53 584 | 1.74 | — |
| $N_2$ surface [m$^2$/g] ISO 5794/1D | 148 | 175 |
| CTAB [m$^2$/g] | 155 | 165 |
| DBP [ml/100 g] | 170 | 200 |

B) Examination of products modified with silane using 13C-NMR solid body spectroscopy determination of the degree of reaction Spectrometer: Bruker AM250 Solid body attachment for 7 mm rotors Measurement frequency: 62.9 MHz Spinner frequency: approx. 4 KHz Relaxation delay: 3 s 90° pulse H-1: 7.6 (s Contact time: 3.25 ms This example is illustrated by the spectrum given in FIG. 1 for the reaction product of Ultrasil 3370 GR with Si 69 (7.4%).

The identification of the signals is as follows:

| Signal | C-atoms | ppm |
|---|---|---|
| I | Si—*CH$_2$—CH$_2$—CH$_2$—S$_4$ | 10.4 |
| II | Si—O*CH$_2$—CH$_3$ | 16.1 |
| III | Si—CH$_2$—*CH$_2$—CH$_2$—S$_4$ | 21.2 |
| IV | Si—CH$_2$—CH$_2$—*CH$_2$—S$_4$ | 40.1 |
| V | Si—O*CH$_2$—CH$_3$ | 57.3 |

In this example the factor for the unreacted alkoxy groups of the silane can be determined from the ratio of the integration of the signals IV+V. In Example 2 this ratio is determined on a concrete example.

C) Determination of the degree of reaction between silica and organosilane via the quantity of ethanol being liberated on mixing (in situ)

As it is not possible to determine the reaction of the alkoxy groups of the silane in a rubber mixture containing silica by means of $^{13}$C-NMR solid body spectroscopy it is necessary to use another examination method.

The in-situ addition of silane to mixtures containing silica causes alcohol to be liberated during the mixing process. The alcohol escapes from the rubber mixture into the kneader shaft and further into the kneader's extraction system. By means of a measuring tube above the kneader shaft it is possible quantitatively to determine the alcohol being liberated from the silica/silane reaction. This takes place by using a flame ionization detector in which the following measurement and equipment parameters are set. The measurement is carried out according to VDI 3481 Part 1.

Analyzer: Ratfisch FID analyzer RS 53

Measuring range set: 0–100 (0–1000) ppm Cl

Analytical limit: 0.1% of the measuring range set

Sampling probe: heated line with Teflon core and quartz wool filter

Plotting of the measured values: 2 channel Servogor plotter RG 6

A factor for the unreacted portion of the ethoxy groups of the silane of $$F = \frac{A - Z}{Z}$$

can be determined from the ratio between the theoretically possible amount of ethanol being released and the amount actually being released.

A=theoretically possible amount of ethanol being released

Z=amount of ethanol released in practice

F=factor for unreacted ethoxy groups.

D) Determination of the dispersion of fillers in rubber mixtures

Dispersion is determined by means of a roughness measurement with a device made by Federal, dispersion analysis EM D-4000-W7.

A piece of rubber (20×2 mm) is cut out of a 2 mm vulcanization panel (Example 3) using a cutting device supplied by the above-mentioned equipment manufacturer, and clamped in a holding device supplied by the equipment manufacturer. The surface of the vulcanizate is scanned with a diamond needle and the surface roughness created because of the dispersion is determined. This procedure provides a quantitative statement about the dispersion, the equipment determining a parameter $F^2H$, where F means the number of peaks and H their average height. The lower this parameter, the better the dispersion of the filler in the vulcanizate sample.

EXAMPLE 1

Comparison between the compounds according to the invention and in situ silane addition and pre-modified products according to EP 0 442 143 B1 and EP 0 177 674 B1

| Formula | 1 | 2 | 3 | 4 |
|---|---|---|---|---|
| Buna VSL 5025 1 HM | 96 | 96 | 96 | 96 |
| Buna CB 11S | 30 | 30 | 30 | 30 |
| Ultrasil 3370 GR | 80 | — | — | — |
| Mod. products according to EP 0 177 674 B1 as granulate | — | 86.4 | — | — |
| Mod. products according to EP 0 442 143 B1 as granulate | — | — | 86.4 | — |
| Product VTM4 according to the invention | — | — | — | 84.0 |
| Si 69 | 6.4 | — | — | — |
| ZnO RS | 3 | 3 | 3 | 3 |
| Stearic acid | 2 | 2 | 2 | 2 |
| Protector G 35 | 1.0 | 1.0 | 1.0 | 1.0 |
| Naftolen ZD | 15 | 15 | 15 | 15 |
| Vulkanox 4020 | 1.5 | 1.5 | 1.5 | 1.5 |
| Vulkacit D | 2 | 2 | 2 | 2 |
| Vulkacit CZ | 1.7 | 1.7 | 1.7 | 1.7 |
| Sulphur | 1.4 | 1.4 | 1.4 | 1.4 |

| Vulcanization temperature: 165° C. | 1 | 2 | 3 | 4 |
|---|---|---|---|---|
| $F^2H$ | 38707 | 48438 | 61197 | 29240 |
| Tensile strength, MPa | 13.3 | 15.9 | 14.9 | 15.6 |
| 300% modulus, MPa | 9.8 | 10.1 | 10.5 | 10.7 |
| Elongation at break, % | 460 | 425 | 430 | 420 |
| Tear resistance, N/mm | 23 | 22 | 22 | 22 |
| Ball rebound, % | 35.9 | 30.7 | 33.4 | 39.5 |
| DIN abrasion resistance, mm³ | 83 | 74 | 78 | 58 |
| Shore hardness, | 67 | 69 | 69 | 74 |
| tan δ (60° C.) | 0.133 | 0.142 | 0.130 | 0.104 |

EXAMPLE 2

Determination of the degree of reaction for Mixture No. 1 from Example 1

In formula 1, according to Example 1, silica filler and Si 69 are brought to reaction according to the mixing instructions below and the ethanol that is liberated thereby is determined during the first mixing stage by means of flame ionization detector, as described under C).

Mixing instructions for Mixture No. 1 according to Example 1:

| Stage 1: | |
|---|---|
| Mixing equipment: | Werner und Pfleiderer, GKN 3.65 liters |
| Friction: | 1:1.11 |
| RPM: | 50 |
| Die pressure: | 5.5 bars |
| Volume when empty: | 3.65 l |
| Degree of filling: | 0.70 |
| Coolant temperature: | 50° C. |
| 0'–1' | Buna VSL 5025 1 HM, Buna CB 11 S |
| 1'–3' | Filler, Si 69, ZnO, stearic acid, Naftolen ZD, Vulkanox 4020, Protector G35 |
| 3' | cleaning |
| 3'–5' | further mixing |
| 5' | withdrawal |
| Batch ejection temperature: | 162° C. |
| Intermediate storage: | 24 h/RT |
| Stage 2: | |
| Mixing equipment: | Werner und Pfleiderer, GKN 3.65 liters |
| Friction: | 1:1.11 |
| RPM: | 30 |
| Die pressure: | 5.5 bars |
| Volume when empty: | 3.65 l |
| Degree of filling: | 0.68 |
| Coolant temperature: | 80° C. |
| 0'–1.5' | Batch stage 1, accelerator, sulphur |
| 1.5' | withdrawal |
| Batch ejection temperature: | 106° C. |
| Intermediate storage: | |

The batch was processed on a roller as follows after each kneader process:

cutting 3 times to the left, 3 times to the right tumbling 3 times narrow, 3 times wide Sheet withdrawal.

Result:

Amount of ethanol theoretically being released: 42.5 g

Amount of ethanol actually released under these mixing conditions: 15.25 g $$F = \frac{42.5 - 15.25}{15.25} = 1.8$$

It can therefore be said that under the above-mentioned conditions, 1.8 of the three ethoxy groups of the triethoxysilyl group have not reacted.

EXAMPLE 3

Figure 2B:
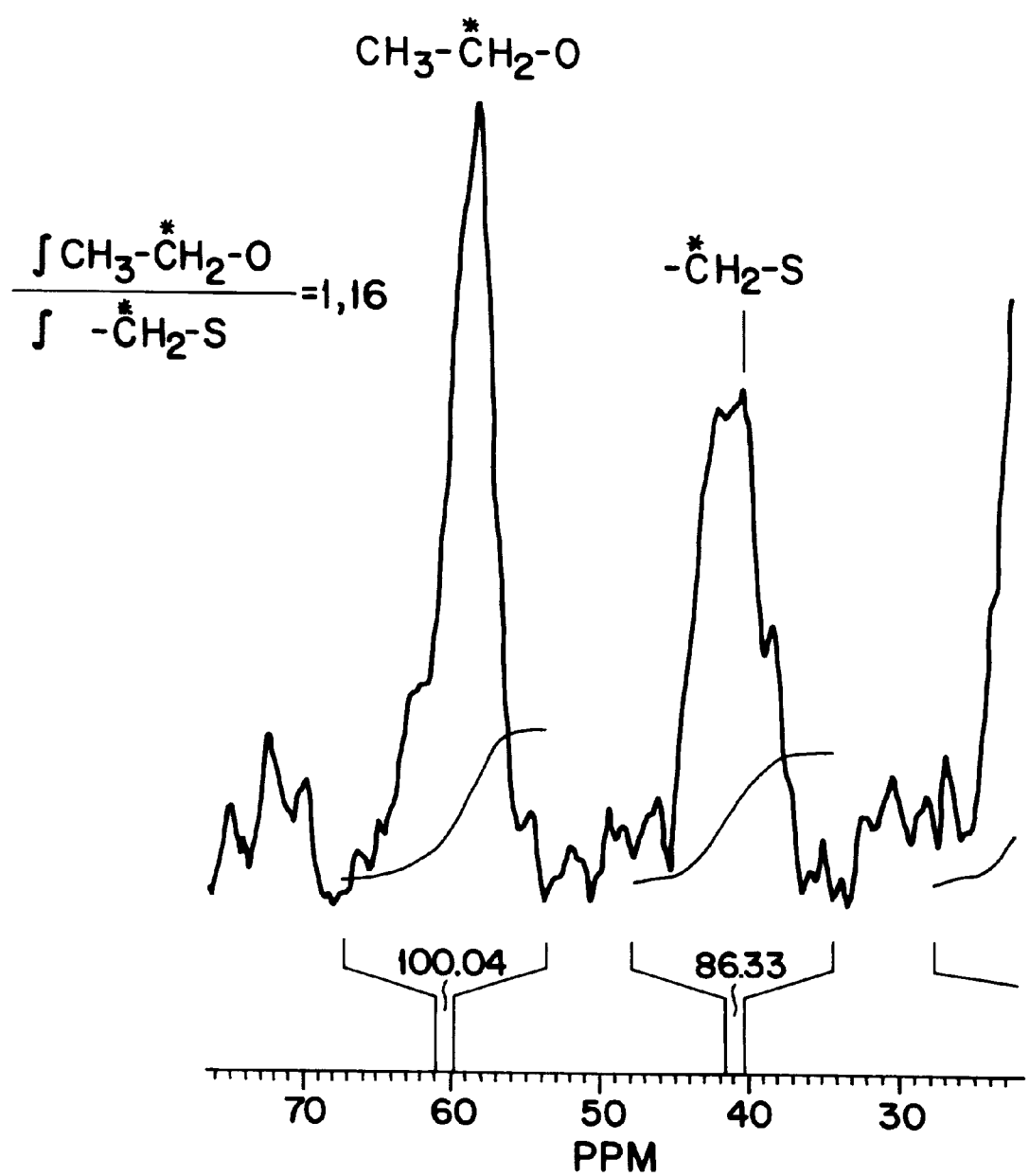
FIG. 2b is $^{13}$C—NMR spectrum of the product according to EP 177,674.
Figure 2C:
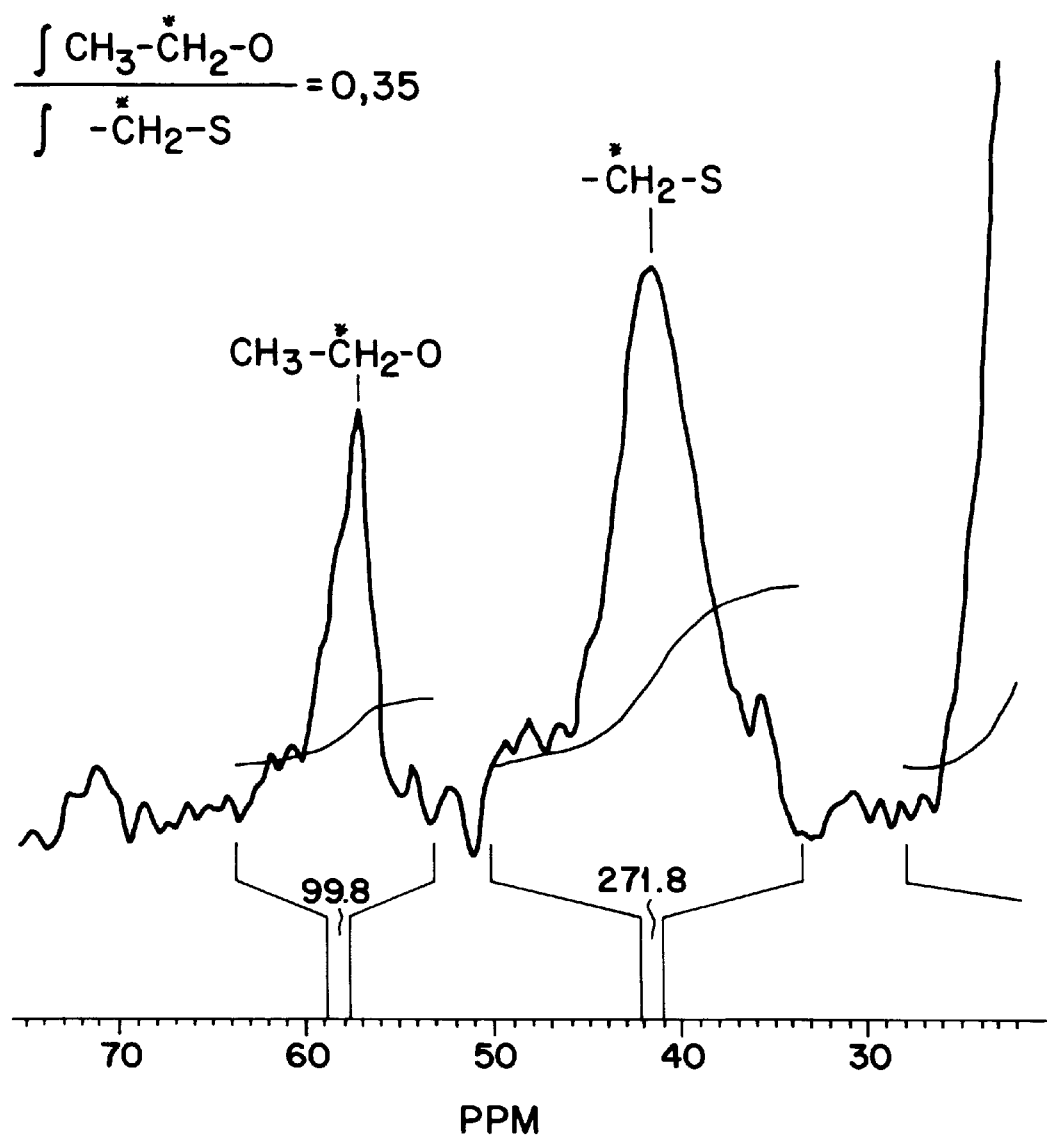
FIG. 2c is $^{13}$C—NMR spectrum of VTM4 according to the invention.

Determination of the degree of reaction (=unreacted ethoxy groups) of the various manufacturing methods Products according to EP 0 442 143 B1, EP 0 177 674 B1 and product VTM4 according to the invention by means of $^{13}$C-NMR solid body spectroscopy as shown by FIGS. 2a, 2b and 2c, respectively.

| | in situ, as per Example 2 | EP 0 442 143 B1, as per 2a) | EP 0 177 674 B1, as per 2b) | VTM4, as per 2c) |
|---|---|---|---|---|
| Factor for unreacted ethoxy groups | 1.80 | 1.90 | 1.16 | 0.35 |

EXAMPLE 4

Storage stability of the various silane-modified products by means of $^{13}$C-NMR solid body spectroscopy The progress of factor F during the storage of the products modified with silane can be seen from the graph in FIG. 3.

It can be seen that the products according to EP 0 177 674 B1 and/or EP 0 442 143 B1 lose alcohol (ethanol) during storage whereas the product according to the invention "VTM3", is absolutely stable because of the absence of alkoxy groups. In contrast to VTM4, a product temperature of approx. 150° C. is set in this case.

What is claimed is:

1. Low-dust, well dispersible granulates based on precipitated silicate filler and modified with at least one organosilicon compound having the general formula:

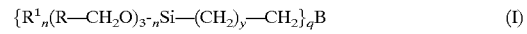

$$\{R^1{}_n(R\text{—}CH_2O)_{3-n}Si\text{—}(CH_2)_y\text{—}CH_2\}_qB \quad (I)$$

where q is 1 or 2;

B is -SCN; -Cl or $-NH_2$, where q=1, or $-S_x-$, where x is 2–8, when q=2;

R is H or an alkyl group having 1–4 carbon atoms; $R_1$ is an alkyl group having 1–4 carbon atoms; R and $R_1$ may have the same or different meanings in each occurrence; n is 0, 1 or 2 and y is 0–19;

wherein the degree of reaction of the alkoxy groups is given in the form of the integration ratio of $(CH_2O)/\{(CH_2)_y\text{—}CH_2\text{—}B\}$, and the signals for these groups are obtained by means of $^{13}$C-NMR spectroscopy; and where the ratio for the compound, when q=2, is at most 0.4 and the ratio for the compound, when q=1, is at most 0.15.

2. The granulates according to claim 1, wherein the precipitated silicate filler is precipitated silica and wherein, after modification, the granulate has a specific surface of 35 to 400 m²/g, a CTAB of 35 to 350 m²/g and a DBP number of 100 to 300 ml/100 g.

3. The granulates according to claim 1, wherein said granulates comprise substantially spherical particles.

4. A process for manufacturing the granulates of claim 1, comprising:

a) forming an aqueous suspension of a precipitated silicate filler, wherein the suspension has a pH of 1 to 5;

b) spraying or nozzle-injecting the suspension and one or more of the compounds having the formula (I) into a heated fluidized bed;

c) removing the resulting moist granulates modified with the compounds from the fluidized bed;

d) drying the granulates, optionally in different temperature stages;

e) optionally separating out fine granulates and returning the fine granulates to the fluidized bed; and f) adjusting the pH of the granulates to be within the range of 5.5 to 8.5.

5. The process according to claim 4, wherein step a) further comprises liquefying with sulfuric acid and using shearing force a silicate filter cake obtained after precipitation and filtration of silicates from a silicate solution thereby forming an aqueous suspension having a solids content of 17 to 24%.

6. The process according to claim 4, wherein the suspension is sprayed or nozzle-injected via a multi-component nozzle into a heated fluidized bed, the suspension comprising one or more of the compounds according to formula (I), where were homogeneously distributed within the suspension prior to spraying or nozzle-injecting.

7. The process according to claim 4, wherein the organosilicon compounds are added to the suspension in a quantity from >0 to 25 wt. %, related to the filler.

8. The process according to claim 4, further comprising removal of moist granulates with a water content of 55 to 70 wt. % based on total granulate weight.

9. The process according to claim 4, wherein suspensions of a precipitated silica are used.

10. The process according to claim 4 wherein the silicate filler suspension is obtained by liquefying a filter cake with dilute sulfuric acid, said cake being obtained from the manufacture of precipitated silica.

11. Vulcanizable rubber mixtures comprising the granulates according to claim 1.

12. Low-dust, well dispersible granulates based on precipitated silicate fillers and modified with at least one organosilicon compound having the general formula:

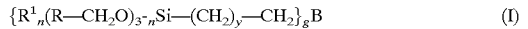

$$\{R^1_n(R\text{—}CH_2O)_{3-n}Si\text{—}(CH_2)_y\text{—}CH_2\}_gB \qquad (I)$$

where q is 1 or 2;

B is -SCN; -Cl or -NH$_2$, where q=1, or -S$_x$-, where x is 2–8, when q=2;

R is H or an alkyl group having 1–4 carbon atoms; R$_1$ is an alkyl group having 1–4 carbon atoms; R and R$_1$ may have the same or different meanings in each occurrence; n is 0, 1 or 2 and y is 0–19;

wherein the degree of reaction of the alkoxy groups is given in the form of the integration ratio of (CH$_2$O)/{(CH$_2$)$_y$—CH$_2$—B}, and the signals for these groups are obtained by means of $^{13}$C-NMR spectroscopy; and where the ratio for the compound, when q=2, is at most 0.4 and the ratio for the compound when q=1, is at most 0.15, and wherein after the modification the granulate has a specific surface area of 100 to 250 m$^2$/g.

13. Low-dust, well dispersible granulates based on precipitated silicate fillers and modified with at least one organosilicon compound having the general formula:

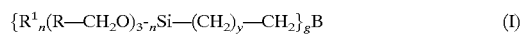

$$\{R^1_n(R\text{—}CH_2O)_{3-n}Si\text{—}(CH_2)_y\text{—}CH_2\}_gB \qquad (I)$$

where q is 1 or 2;

B is -SCN; -Cl or -NH$_2$, where q=1, or -S$_x$-, where x is 2–8, when q=2;

R is H or an alkyl group having 1–4 carbon atoms; R$_1$ is an alkyl group having 1–4 carbon atoms; R and R$_1$ may have the same or different meanings in each occurrence; n is 0, 1 or 2 and y is 0–19;

wherein the degree of reaction of the alkoxy groups is given in the form of the integration ratio of (CH$_2$O)/{(CH$_2$)$_y$—CH$_2$—B}, and the signals for these groups are obtained by means of $^{13}$C-NMR spectroscopy; and where the ratio for the compound, when q=2, is at most 0.4 and the ratio for the compound, when q=1, is at most 0.15, and wherein after modification the granulate has a CTAB surface of 35 to 350 m$^2$/g.

14. Low-dust, well dispersible granulates based on precipitated silicate fillers and modified with at least one organosilicon compound having the general formula:

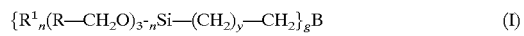

$$\{R^1_n(R\text{—}CH_2O)_{3-n}Si\text{—}(CH_2)_y\text{—}CH_2\}_gB \qquad (I)$$

where q is 1 or 2;

B is -SCN; -Cl or -NH$_2$, where q=1, or -S$_x$-, where x is 2–8, when q=2;

R is H or an alkyl group having 1–4 carbon atoms; R$_1$ is an alkyl group having 1–4 carbon atoms; R and R$_1$ may have the same or different meanings in each occurrence; n is 0, 1 or 2 and y is 0–19;

wherein the degree of reaction of the alkoxy groups is given in the form of the integration ratio of (CH$_2$O)/{(CH$_2$)$_y$—CH$_2$—B}, and the signals for these groups are obtained by means of $^{13}$C-NMR spectroscopy; and where the ratio for the compound, when q=2, is at most 0.4 and the ratio for the compound, when q=1, is at most 0.15, and wherein after modification granulate has DBP number of 150 to 250 ml/100 g.

15. The process according to claim 4, wherein the pH in step F is adjusted to a range of 6 to 7.5.

* * * * *